United States Patent
Cornish et al.

(10) Patent No.: US 11,530,148 B2
(45) Date of Patent: Dec. 20, 2022

(54) CERIUM-LANTHANUM TREATMENT METHOD FOR REDUCTION OF CONTAMINANTS IN WASTEWATER MEMBRANE BIOREACTORS

(71) Applicant: Neo Water Treatment, LLC, Greenwood Village, CO (US)

(72) Inventors: Pamela Leigh Cornish, White Lake, MI (US); Mason Reames Haneline, Orange, CA (US)

(73) Assignee: Neo Water Treatment, LLC, Greenwood Village, CO (US)

( * ) Notice: Subject to any disclaimer, the term of this patent is extended or adjusted under 35 U.S.C. 154(b) by 0 days.

(21) Appl. No.: 17/219,359

(22) Filed: Mar. 31, 2021

(65) Prior Publication Data

US 2021/0276901 A1 Sep. 9, 2021

Related U.S. Application Data

(63) Continuation of application No. 16/581,561, filed on Sep. 24, 2019, now Pat. No. 10,988,395.
(Continued)

(51) Int. Cl.
*C02F 3/12* (2006.01)
*C02F 1/52* (2006.01)
(Continued)

(52) U.S. Cl.
CPC ............ *C02F 3/1215* (2013.01); *B01D 61/16* (2013.01); *B01D 61/22* (2013.01); *C02F 1/5236* (2013.01);
(Continued)

(58) Field of Classification Search
CPC .... C02F 3/1215; C02F 1/5236; C02F 1/5245; C02F 3/1268; C02F 3/1273;
(Continued)

(56) References Cited

U.S. PATENT DOCUMENTS

| 3,507,804 A | 4/1970 | Ropp |
| 5,340,556 A | 8/1994 | Collin et al. |

(Continued)

FOREIGN PATENT DOCUMENTS

| CN | 109437503 A | 3/2019 |
| CN | 109607753 A | 4/2019 |

(Continued)

OTHER PUBLICATIONS

Guo, Y.; Woznicki, P; Barkatt, A.; Saad, E. E., "Sol-gel Synthesis of Microcrystalline Rare Earth Orthophosphates", J. Mater. Res., 1996, 11, pp. 639-649, Abstract.
(Continued)

*Primary Examiner* — Fred Prince
(74) *Attorney, Agent, or Firm* — Melissa M. Hayworth; George C. Lewis; Merchant & Gould PC

(57) ABSTRACT

Disclosed are methods of treating wastewater using a membrane bioreactor and achieving a target phosphorus concentration for the membrane permeate stream. These methods include the steps of dosing a wastewater stream with a rare earth clarifying agent and passing the dosed wastewater stream through the membrane to obtain a membrane permeate stream with a permeate concentration that is less than the phosphorus concentration of the influent stream. This permeate concentration also can be equal to or less than a target phosphorus concentration. In the methods as disclosed herein, the rare earth clarifying agent can be chloride salts of one or more rare earth elements and in certain embodiments, the rare earth clarifying agent can be $CeCl_3$ and $LaCl_3$.

19 Claims, 8 Drawing Sheets

Related U.S. Application Data

(60) Provisional application No. 62/736,122, filed on Sep. 25, 2018.

(51) Int. Cl.
  *B01D 61/16* (2006.01)
  *B01D 61/22* (2006.01)
  *C02F 101/10* (2006.01)

(52) U.S. Cl.
  CPC .......... *C02F 1/5245* (2013.01); *C02F 3/1268* (2013.01); *C02F 3/1273* (2013.01); *B01D 2311/04* (2013.01); *B01D 2311/12* (2013.01); *B01D 2311/246* (2013.01); *B01D 2311/2642* (2013.01); *B01D 2311/2688* (2013.01); *B01D 2315/06* (2013.01); *C02F 2101/105* (2013.01); *C02F 2209/003* (2013.01); *C02F 2209/08* (2013.01); *C02F 2209/10* (2013.01); *C02F 2209/11* (2013.01); *C02F 2209/18* (2013.01); *C02F 2209/22* (2013.01); *C02F 2209/40* (2013.01); *Y02W 10/10* (2015.05)

(58) Field of Classification Search
  CPC .......... C02F 2101/105; C02F 2209/003; C02F 2209/08; C02F 2209/10; C02F 2209/11; C02F 2209/18; C02F 2209/22; C02F 2209/40; B01D 61/16; B01D 61/22; B01D 2311/04; B01D 2311/12; B01D 2311/246; B01D 2311/2642; B01D 2311/2688; B01D 2315/06; Y02W 10/10
  USPC ........ 210/601, 605, 614, 620, 630, 631, 906
  See application file for complete search history.

(56) References Cited

U.S. PATENT DOCUMENTS

| | | | |
|---|---|---|---|
| 5,562,889 | A | 10/1996 | Collin et al. |
| 2004/0168980 | A1 | 9/2004 | Musale et al. |
| 2006/0231499 | A1* | 10/2006 | Brummett ............. C02F 1/5236 210/723 |
| 2008/0223783 | A1 | 9/2008 | Sutton |
| 2009/0223903 | A1 | 9/2009 | Coffey et al. |
| 2010/0264084 | A1* | 10/2010 | Midorikawa ........ B01J 20/0211 210/85 |
| 2016/0304378 | A1* | 10/2016 | Wright ..................... C02F 11/12 |
| 2020/0156968 | A1* | 5/2020 | Henderson ............ C02F 1/5245 |

FOREIGN PATENT DOCUMENTS

| | | |
|---|---|---|
| CN | 109701499 A | 5/2019 |
| WO | 20120100264 A1 | 7/2012 |
| WO | 2016015329 A1 | 4/2016 |
| WO | 20190089954 A1 | 5/2019 |

OTHER PUBLICATIONS

Onoda, H.; Funamoto, T., "Preparation and Fluorescence of Crystalline Gel Rare Earth Phosphates", J. Fluoresc. 2015, 25, pp. 247-251.

Zhu, D.; Chen, Q.; Qiu, T.; Zhao, G.; Fang, X., "Optimization of Rare Earth Carbonate Reactive-Crystallization Process Based on Response Surface Method", J. Rare Earths, in press corrected proof, https://doi.org/10.1016/j.ire.2020.03.011, pp. 1-7.

Iorhemen, O. T.; Hamza, R. A.; Tay, J. H., "Membrane Bioreactor (MBR) Technology for Wastewater Treatment and Reclamation: Membrane Fouling", Membranes, 2016, 6, pp. 1-29.

Wang, Z.; Ma, J.; Tang, C. Y.; Kimura, K.; Wang, Q.; Han, X., "Membrane Cleaning in Membrane Bioreactors: A Review", J. Membr. Sci., 2014, 468, pp. 276-307.

Wang, Z.; Wu, Z.; Yin, X.; Tian, L., "Membrane Fouling in a Submerged Membrane Bioreactor (MBR) Under Sub-Critical Flux Operation: Membrane Foulant and Gel Layer Characterization", J. Membr. Sci., 2008, 325, pp. 238-244.

Zhang, Z.; Wang, Y., Leslie, G. L.; Waite, T. D., "Effect of Ferric and Ferrous Iron Addition on Phosphorus Removal and Fouling in Submerged Membrane Bioreactors", Water Res., 2015, 69, pp. 210-222.

Field, E., et al., "Effects of Solids Retention Time In Membrane Bioreactors On Reverse Osmosis Membrane Fouling", Masters Thesis, The University of New Mexico, Albuquerque, NM, 2009.

Dupont FilmTecTM Reverse Osmosis Membranes Technical Manual; 2020; Version 3, Chapter 2.9 "Prevention of Iron and Manganese Fouling", pp. 72 and 73.

Orhanovic, Z.; Pokric, B.; Furedi, H.; Branica, M. "Precipitation and Hydrolysis of Metallic Ions. III. Studies on the Solubility of Yttrium and Some Rare Earth Hydroxides", Croat. Chem. Acta, 1966, 38, pp. 269-276.

Zhang, Z., "Phosphorus Removal and Membrane Fouling and Cleaning in Iron-dosed Submerged Membrane Bioreactor Treatment of Wastewaters", Ph.D. Dissertation, The University of New South Wales, Sydney, Australia, 2014.

Strileski, M., "Phosphorus Removal From EBPR Sludge Dewatering Liquors Using Lanthanum Chloride, Aluminum Sulfate and Ferric Chloride", UNLV Theses, DisseitaLions, Professional Papers, and Capstones, University of Nevada, Las Vegas 2013 pp. 1-84. https://digitalscholarship.unlv.edu/thesesdissertations.

Recht, H.L., and Masood Ghassemi, "Phosphate Removal from Wastewaters Using Lanthanum Precipitation", Atomics International for the Federal Water Quality Administration Department of the Interior, Program #17010 EFX, Contract #14-12-183 1970 pp. 1-65. https://books.google.com.

Neo et al., "Chemistry of Rare Earth Elements in Wastewater", Technology Chemistry in Wastewater (Sep. 24, 2017) entire document; https://neowatertreatement.com/wp-content/uploads/2017/09/RETechnology_Chemistry_in_Wastewater.pdf.

International Search Report dated Dec. 17, 2019 in corresponding PCT/US2019/052968 pp. 1-2.

\* cited by examiner

CERIUM-LANTHANUM TREATMENT METHOD FOR REDUCTION OF CONTAMINANTS IN WASTEWATER MEMBRANE BIOREACTORS

This application is a Continuation of U.S. application Ser. No. 16/581,561 filed Sep. 24, 2019, which claims priority to U.S. Provisional Application No. 62/736,122 filed Sep. 25, 2018, both of which are entitled "CERIUM-LANTHANUM TREATMENT METHOD FOR REDUCTION OF CONTAMINANTS IN WASTEWATER MEMBRANE BIOREACTORS". The contents of both of these applications are hereby incorporated by reference in their entirety.

INTRODUCTION

Wastewater is a broad term that includes both human-generated wastewater (e.g., sewage) and industrial waste streams of water combined with various contaminants from the industrial process. Wastewater typically must be treated to remove at least some of the contaminants before it can be discharged into the environment or reused.

One common technology for the treatment of wastewater is the membrane bioreactor (MBR). A MBR is a technology that combines a membrane filtration process, like microfiltration or ultrafiltration, with a biological wastewater treatment process, such as the activated sludge process. Two MBR configurations exist: internal/submerged, where the membranes are immersed in and integral to the biological reactor and external/sidestream, where membranes are a separate unit process requiring an intermediate pumping step.

MBRs have been shown to be very effective in the treatment of wastewater. In addition, MBRs wastewater treatment plants are simple and inexpensive to operate when compared to other wastewater treatment technologies. MBRs also are known to have a small footprint. MBRs are particularly effective at removing particulate from wastewater.

Membrane materials of membranes used in MBRs may include the following: polyvinylidene fluoride (PVDF); polyether sulfone (PES); polysulfone (PS); polyacrylonitrile (PAN); polyvinylchloride (PVC); polypropylene; chlorinated polyethylene; polyimide; polyamide; cellulose acetate; silicone-coated polyimide; polyether ether ketone (PEEK), alumina, silica, or ceramic, among others. Membranes are typically classified by nominal pore size in microns, with a pore size of 0.0001 micron being typically used in reverse osmosis application up to 0.1 micron pore size, which is commonly used in MBRs and other low pressure filtration applications. The membranes also may have different configurations such as flat sheet, hollow fiber, tubular, and spiral wound to name but a few.

One weakness of the MBR technology is the technology's effectiveness in phosphorus (P) removal. While an essential element for plant life, when there is too much phosphorus in water it can speed up eutrophication (a reduction in dissolved oxygen in water bodies caused by an increase of mineral and organic nutrients) of rivers and lakes which can be extremely harmful to aquatic animal life. For this reason, phosphorus discharge levels are a closely regulated performance criterion for any wastewater treatment plant.

Phosphorus is most commonly found in wastewater in the form of the phosphate ion ($PO_4^{3-}$). The phosphate ion $PO_4^{3-}$ is relatively small and many common phosphate salts (such as salts of sodium, potassium and ammonium) found in wastewater are very water soluble and are difficult to cost-effectively remove using a MBR. This is because the phosphate salts are neither cost-effectively removed by the biological process nor the membrane filtration.

Attempts have been made to improve the phosphorus removal performance of MBRs. Clarifying agents, such as ferric, have been used to precipitate soluble phosphorus and remove it with the solids. However, the current clarifying agents and other techniques that improved the removal of phosphorus by the biological process result in excessive levels of fouling or damage to the membranes in the filtration process. When the membranes become fouled, the MBR operation needs to be halted and the membranes are cleaned or replaced. Using more restrictive membranes that could remove phosphate ions increases the necessary pressure differential across the membrane so much that it makes the pumping costs too excessive to be reasonable. MBRs could be used more commonly and effectively in wastewater treatment if efficient and effective phosphorus removal could be combined with the MBR.

Thus, effective methods of treating wastewater with MBR while removing phosphorus waste are needed.

SUMMARY

As disclosed herein, the present methods are methods of treating wastewater using a membrane bioreactor. These methods include the steps of dosing a wastewater stream, as part of the membrane bioreactor system, containing a first concentration of phosphorus with a dose amount of a rare earth clarifying agent to obtain a dosed wastewater stream, the first concentration of phosphorus being greater than a target concentration of phosphorus, and passing the dosed wastewater stream through the membrane to obtain a membrane permeate stream, the membrane permeate stream having a permeate concentration of phosphorus less than the first concentration phosphorus. In the methods as disclosed herein, the rare earth clarifying agent can be chloride salts of one or more rare earth elements. In certain embodiments, the rare earth clarifying agent can be $CeCl_3$ and $LaCl_3$.

In these methods, the rare earth clarifying agent can be used such that the membrane permeate stream has a permeate concentration of phosphorus equal to or less than the target concentration of phosphorus. Additionally, in these methods, the dose amount of the clarifying agent can be set and/or changed based on the permeate concentration of phosphorus, to achieve a permeate concentration of phosphorus equal to or less than the target concentration of phosphorus.

In particular embodiments, the methods as disclosed herein are methods for treating wastewater using a membrane bioreactor including the steps of dosing a wastewater stream, as part of the membrane bioreactor system, containing a first concentration of phosphorus with a dose amount of a rare earth clarifying agent comprising $CeCl_3$ and $LaCl_3$ to obtain a dosed wastewater stream, the first concentration of phosphorus being greater than a target concentration of phosphorus; removing at least some of the phosphorus as precipitated sludge from the wastewater stream; and passing the dosed wastewater stream through the membrane to obtain a membrane permeate stream, the membrane permeate stream having a permeate concentration of phosphorus less than the first concentration phosphorus.

DETAILED DESCRIPTION

Figure 1:
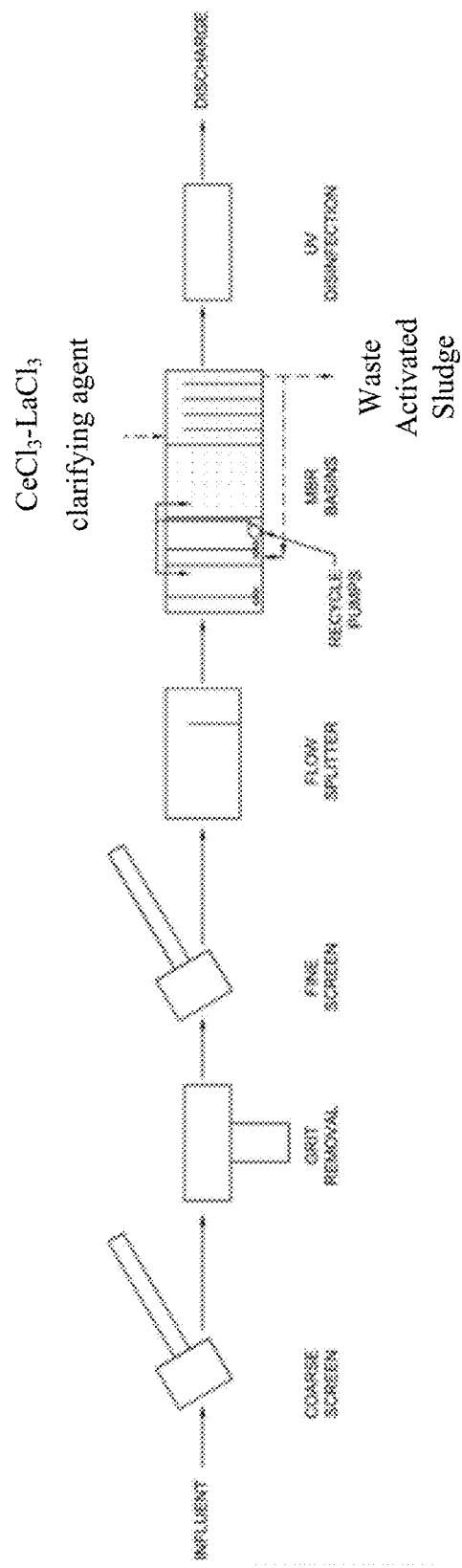
FIG. 1 illustrates an embodiment of an internal/submerged MBR configuration with $CeCl_3$—$LaCl_3$ clarifying agent added to the MBR basins.

Before the methods are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. It must be noted that, as used in this specification, the singular forms "a," "an," and "the" include plural referents unless the context clearly dictates otherwise. Thus, for example, reference to "a lithium hydroxide" is not to be taken as quantitatively or source limiting, reference to "a step" may include multiple steps, reference to "producing" or "products" of a reaction should not be taken to be all of the products of a reaction, and reference to "reacting" may include reference to one or more of such reaction steps. As such, the step of reacting can include multiple or repeated reaction of similar materials to produce identified reaction products.

The present invention relates to methods of using rare earth (RE) clarifying agents in methods of treating wastewater as part of a MBR. Using the rare earth clarifying agents in combination with a MBR allows for effective operation of the MBR for removal of phosphorus from the wastewater stream, while also allowing for efficient operation of the MBR without premature fouling of the membrane. The MBR methods as disclosed herein can be in either configuration of a MBR: an internal/submerged MBR configuration or an external/sidestream MBR configuration. The MBR methods as disclosed herein combine treatment with a rare earth clarifying agent with a membrane filtration process as part of a biological wastewater treatment process. The rare earth clarifying agents are added or dosed at any point within the MBR treatment system.

It has been determined that chloride salts of rare earth elements have beneficial effects as clarifying agents in the removal of phosphorus (P) from wastewater in a MBR. As such, as used herein, rare earth clarifying agents are chloride salts of rare earth elements. These rare earth elements include all of the rare earth elements individually, as well as mixtures thereof. In certain embodiments, certain mixtures of rare earth elements may be particularly attractive, and in yet other embodiments, the light rare earth elements and mixtures thereof are particularly attractive.

As disclosed herein, the clarifying agents that are used in the MBR are typically an aqueous solution of chloride salts of the rare earth elements, either individually or mixtures thereof. As expressed herein, the percentages of rare earth element are by mol relative to the total mol of all rare earth elements in the composition, unless otherwise specified. For compositions of cerium and lanthanum, percentages expressed by mol and weight are essentially the same because the molecular weight of cerium (140.116 g/mol) and lanthanum (138.9055 g/mol) are so close.

The clarifying agents as disclosed and used herein are chloride salts of rare earth elements. The rare earth elements (REE) are a group of seventeen metallic elements—the fifteen lanthanides, with atomic numbers 57 (lanthanum, La) to 71 (lutetium, Lu), together with yttrium (Y, atomic number 39) and scandium (Sc, atomic number 21).

Specifically, the rare earth elements (REE) are cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb) and yttrium (Y). As used herein the rare-earth elements are selected from the group consisting of cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), yttrium (Y), and mixtures thereof. As described herein the light rare earth elements include cerium (Ce), lanthanum (La), praseodymium (Pr), neodymium (Nd), promethium (Pm), samarium (Sm), and mixtures thereof. In one embodiment of the methods as disclosed herein, the clarifying agent may be chloride salts of a mixture of the light rare earth elements.

Because of their chemical similarities, REE tend to occur together in minerals and rocks and they can be difficult to separate from each other. It also may be possible to recycle REE from previous uses, such as high performance magnets, batteries, used electronics, and coal and coal by-products.

As used in the methods for treating wastewater in a MBR, the rare earth clarifying agents can be compositions containing a singular rare earth element or a mixture of rare earth elements. These compositions contain rare earth elements as salts. The rare earth clarifying agents can be aqueous solutions of a single rare earth element chloride salt or aqueous solutions of a mixture of rare earth elements chloride salts.

Cerium (Ce) and lanthanum (La) are two rare earth elements. It has been determined that a combination of Ce and La chloride salts have beneficial effects as clarifying agents in the removal of P from wastewater in a MBR.

Without being held to any particular theory, it is believed that the rare earth chloride salt clarifying agents and the treatment methods described herein effectively bind phosphate ions, as well as other contaminants, in the biological process causing them to be removed with the sludge. Furthermore, experiments have shown that the P removal is achieved without much or any negative effects on the membranes in the MBR and membrane pressure. Certain experiments further showed improvements in the removal of other contaminants such as chemical oxygen demand (COD), biological oxygen demand (BOD) and total suspended solids in mg/L (TSS), among others. This allows the MBR to be used to cost-effectively treat wastewater while also removing P.

As utilized herein fouling of the membrane has a definition according to Gkotsis et al. (See, P. K. Gkotsis; D. Ch.

Banti; E. N. Peleka; A. I. Zouboulis and P. E. Samaras *Processes* 2014, 2, pp. 795-866, the contents of which are herein incorporated by reference in their entirety). Fouling is a three-stage process consisting of 1) conditioning fouling 2) slow steady fouling and 3) Trans-membrane pressure (TMP) jump. In certain instances, when the transmembrane pressure exceeds about 14-20 kPa, the membrane is considered fouled. The transmembrane pressure indicative of fouling will be dependent upon the overall MBR system in which the membrane is used. When the membranes become fouled, the MBR operation needs to be halted and the membranes are cleaned or replaced. An increase in the TMP with a constant flux indicates that the membrane is fouled.

The methods of treating wastewater in a MBR as disclosed herein, allow for operation of the MBR with effective phosphorus removal and without fouling of the membrane for 20 to 80% longer period of time than operation of a MBR using another clarifying agent for phosphorus removal (i.e., ferric). Effective phosphorus removal means removal of phosphorus to achieve a target phosphorus level/amount. In one embodiment, the MBR may be operated with effective phosphorus removal and without fouling of the membrane for 25 to 75% longer than operation of the MBR using another clarifying agent for phosphorus removal (i.e., ferric). In preferred embodiments, the MBR may be operated with effective phosphorus removal and without fouling of the membrane for 35 to 70% longer than operation of the MBR using another clarifying agent for phosphorus removal (i.e., ferric). And in other preferred embodiments, the MBR may be operated with effective phosphorus removal and without fouling of the membrane for 45 to 65% longer than operation of the MBR using another clarifying agent for phosphorus removal (i.e., ferric).

The quantitative/actual length of time that the MBR may be operated without fouling of the membrane varies depending on several factors, including, for example, the influent composition, the target phosphorus level to be achieved, the flux (i.e., pump flow rate/membrane surface area) used for operation, and the pore size of the membrane. Regardless of these variables, the comparative length of time that the MBR may be operated without fouling of the membrane surprisingly is longer as defined above for operation of the MBR using the rare earth clarifying agents compared to operation of the MBR using other known clarifying agents, such as ferric.

Effective phosphorus removal as utilized herein means complying with the effluent total phosphorus (TP) limit or target for the location in which the MBR is operated. In some instances, compliance with the target TP is determined on a monthly basis. The target phosphorus limit varies depending on the environment/location and also may vary depending on the time of year. For example, ultra-low level total phosphorus (TP) limits mean meeting a TP limit of about 0.07 mg/L (as phosphorus) in the discharge. In other environments, target phosphorus levels may be a limit of about 0.1 mg/L or about 0.35 mg/L. In certain embodiments, the target phosphorus levels may be a limit of about 0.05 mg/L to about 1 mg/L. In other embodiments, the target phosphorus level may be from undetectable to about 9 mg/L. In other embodiments, the target phosphorus level may be from undetectable to about 2 mg/L. In some instances, the limit of detection is about 0.05 mg/L.

In one particular embodiment of treating wastewater in a MBR, clarifying salts of rare earth chloride salts of mixtures of Ce with La have been tested and found to be effective. In one embodiment, the clarifying agent for use in wastewater treatment is composed of rare earth chloride salts of Ce and La having from 55.0-75.0% by weight Ce and from 25.0-45.0% La by weight (relative to total mass of Ce and La). In some cases, trace amounts (i.e., less than 1% by weight of the total mass of rare earth elements) of other rare earth chlorides may be present.

In particular embodiments, this includes rare earth chloride salts having a mixture of $CeCl_3$ and $LaCl_3$ with 55.0-75.0% by weight Ce and 25.0-45.0% La by weight, and the balance of rare earth elements being less than 2% by weight in total of other rare earth elements. In certain embodiments, the balance of rare earth elements is less than 1% by weight in total of other rare earth elements. Clarifying salts of 59.8-70.1% Ce by weight and 29.9-40.1% La by weight, of 63.0-69.0% Ce by weight and 30.0-36.0% La by weight, and of 64.0-68.0% Ce by weight and 31.0-35.0% La by weight (with or without trace amounts of other rare earth chlorides) are all further embodiments of the Ce/La clarifying salt.

For the purposes of this application unless otherwise specified (e.g., as above), % of a rare earth element is % of rare earth element by mol relative to total mol of all rare earth elements in the salt composition, without regard to the chloride anion or any other trace salts of non-rare earth elements that may be included in a composition such as NaCl. Common impurities found in rare earth chlorides as utilized herein include sodium, iron, lead, and uranium. In certain embodiments the rare earth clarifying agents contain less than approximately 10 g/L of these common impurities. The rare earth clarifying agents can include less than approximately 9 g/L of sodium, less than approximately 20 mg/L iron, less than approximately 3 mg/L lead, and less than approximately 1 mg/L uranium.

In another embodiment, clarifying agents of chloride salts of "pure rare earth elements" are effective. As used herein, a "pure rare earth element" is 95% or greater of that rare earth element by mol, relative to total mol of all rare earth elements in the composition, the balance being chloride salts of other rare earth elements. As such, the clarifying agents comprise an aqueous solution of chloride salts of the pure rare earth element.

For example, pure cerium is 95% or greater cerium, relative to the total mol of all rare earth elements in the composition. Pure lanthanum is 95% or greater lanthanum; pure neodymium is 95% or greater neodymium; pure yttrium is 95% or greater yttrium; and the like. In some embodiments a "pure rare earth element" may be 99% or greater of that rare earth element, relative to total mol of all rare earth elements in the composition, the balance being chloride salts of other rare earth elements. For example, the clarifying agent may be chloride salts of 99% or greater cerium, relative to the total mol of all rare earth elements in the composition.

In another embodiment, the clarifying agents of chloride salts of pure rare earth elements can be selected from the group consisting of lanthanum (La), praseodymium (Pr), neodymium (Nd), promethium (Pm), samarium (Sm), and yttrium (Y).

In another embodiment, the clarifying salt for use in wastewater treatment in a MBR is a rare earth chloride salt of Ce having from 95-100% Ce by weight (relative to the total mass of rare earth elements) and the balance being chloride salts of other rare earth elements. In particular, this embodiment includes rare earth chloride salts having $CeCl_3$ with the 95.000-99.999% Ce (again, relative to the total mass of rare earth elements in the salt) and the balance being one or more of chloride salts of the other rare earth elements.

The rare earth clarifying agents also can be chloride salts of a mixture of rare earth elements. In one embodiment, the clarifying salt for use in wastewater treatment in a MBR is a rare earth chloride salt of a mixture of Ce and La. As such, the clarifying agents comprise an aqueous solution of chloride salts of these mixtures of rare earth elements.

In one preferred embodiment, the clarifying salts for use in wastewater treatment in a MBR are rare earth chloride salts of Ce and La having from 55.0-75.0% Ce and from 25.0-45.0% La and the balance being chloride salts of other rare earth elements. As such, the clarifying agent comprises an aqueous solution of chloride salts of Ce and La having from 55.0-75.0% Ce and from 25.0-45.0% La. In certain embodiments, this balance of chloride salts of other rare earth elements is less than 2% and in particular embodiments, this balance of chloride salts of other rare earth elements is less than 1%. In certain of these embodiments common impurities selected from the group consisting of sodium, iron, lead, uranium, and mixtures thereof are present in an amount of less than approximately 10 g/L.

Embodiments include rare earth chloride salts having a mixture of $CeCl_3$ and $LaCl_3$ with the 60.0-65.0% Ce and 30.0-40.0% La and the balance (if any) being one or more of chloride salts of the other rare earth elements. Chloride salts of 59.8-70.1% Ce and 29.9-40.1% La, of 63.0-69.0% Ce and 30.0-36.0% La, and of 63.0-68.0% Ce and 31.0-35.0% La (all with the balance being one or more of chloride salts of the other rare earth elements) are all further embodiments of the Ce/La clarifying salt. In certain embodiments, the balance of chloride salts of other rare earth elements is less than 2% or less than 1%. And in certain of these embodiments common impurities selected from the group consisting of sodium, iron, lead, uranium, and mixtures thereof are present in an amount of less than approximately 10 g/L.

In embodiments in which the clarifying salts for use in wastewater treatment in a MBR are rare earth chloride salts of Ce and La having from 55.0-75.0% Ce and from 25.0-45.0% La and the balance (if any) being chloride salts of other rare earth elements, the other rare earth elements may be any one or more of the other rare earth elements. These other rare earth elements may be selected from the group consisting of Pr, Nd, Sm, Y, and mixtures thereof.

Embodiments also include rare earth chloride salts having a mixture of $CeCl_3$ and $LaCl_3$ with 25.0-35.0% Ce and 12.0-20.0% La and the balance being one or more of chloride salts of the other rare earth elements. In certain of these embodiments, the balance of chloride salts of other rare earth elements is greater than 45% or is 50% or greater. The balance may be a single rare earth chloride or chloride salts of a mixture of rare earth elements. For example the balance of chloride salts may be 50% Y, or 50% Sm, or a mixture of 25% Sm and 25% Y.

In an embodiment, the rare earth clarifying salt may be provided in hydrated crystal form (e.g., $RECl_3.xH_2O$).

In other embodiments, the clarifying salt for use in wastewater treatment in a MBR is a rare earth chloride salt mixture, wherein the mixture is 95% or greater of the rare earth Ce and a rare earth selected from praseodymium (Pr), neodymium (Nd), promethium (Pm), samarium (Sm), yttrium (Y), and mixtures thereof. For example, the mixture is 95% or greater of Ce and praseodymium (Pr), by way of example, 50% Ce and 45% Pr or 80% Ce and 15% Pr.

In another embodiment, the clarifying salt for use in wastewater treatment in a MBR is a rare earth chloride salt mixture, wherein the mixture is 95% or greater of the rare earth La and a rare earth selected from praseodymium (Pr), neodymium (Nd), promethium (Pm), samarium (Sm), yttrium (Y), and mixtures thereof. For example, the mixture is 95% or greater of La and praseodymium (Pr), by way of example, 50% La and 45% Pr or 80% La and 15% Pr.

In another embodiment, the clarifying salt for use in wastewater treatment in a MBR is a rare earth chloride salt mixture, wherein the mixture is 95% or greater of the rare earth mixture Pr and a rare earth selected from cerium (Ce), neodymium (Nd), promethium (Pm), samarium (Sm), yttrium (Y), and mixtures thereof. In another embodiment, the clarifying salt for use in wastewater treatment in a MBR is a rare earth chloride salt mixture, wherein the mixture is 95% or greater of the rare earth mixture Pr and a rare earth selected from lanthanum (La), neodymium (Nd), promethium (Pm), samarium (Sm), yttrium (Y), and mixtures thereof.

In another embodiment, the clarifying salt for use in wastewater treatment in a MBR is a rare earth chloride salt mixture, wherein the mixture is 95% or greater of the rare earth mixture Nd and a rare earth selected from cerium (Ce), praseodymium (Pr), promethium (Pm), samarium (Sm), yttrium (Y), and mixtures thereof. In yet another embodiment, the clarifying salt for use in wastewater treatment in a MBR is a rare earth chloride salt mixture, wherein the mixture is 95% or greater of the rare earth mixture Nd and a rare earth selected from lanthanum (La), praseodymium (Pr), promethium (Pm), samarium (Sm), yttrium (Y), and mixtures thereof.

In another embodiment, the clarifying salt for use in wastewater treatment in a MBR is a rare earth chloride salt mixture, wherein the mixture is 95% or greater of the rare earth mixture Pm and a rare earth selected from cerium (Ce), praseodymium (Pr), neodymium (Nd), samarium (Sm), yttrium (Y), and mixtures thereof. In yet another embodiment, the clarifying salt for use in wastewater treatment in a MBR is a rare earth chloride salt mixture, wherein the mixture is 95% or greater of the rare earth mixture Pm and a rare earth selected from lanthanum (La), praseodymium (Pr), neodymium (Nd), samarium (Sm), yttrium (Y), and mixtures thereof.

In another embodiment, the clarifying salt for use in wastewater treatment in a MBR is a rare earth chloride salt mixture, wherein the mixture is 95% or greater of the rare earth mixture Sm and a rare earth selected from cerium (Ce), praseodymium (Pr), neodymium (Nd), promethium (Pm), yttrium (Y), and mixtures thereof. In yet another embodiment, the clarifying salt for use in wastewater treatment in a MBR is a rare earth chloride salt mixture, wherein the mixture is 95% or greater of the rare earth mixture Sm and a rare earth selected from lanthanum (La), praseodymium (Pr), neodymium (Nd), promethium (Pm), yttrium (Y), and mixtures thereof.

In another embodiment, the clarifying salt for use in wastewater treatment in a MBR is a rare earth chloride salt mixture, wherein the mixture is 95% or greater of the rare earth mixture Y and a rare earth selected from cerium (Ce), praseodymium (Pr), neodymium (Nd), promethium (Pm), samarium (Sm), and mixtures thereof. In yet another embodiment, the clarifying salt for use in wastewater treatment in a MBR is a rare earth chloride salt mixture, wherein the mixture is 95% or greater of the rare earth mixture Y and a rare earth selected from lanthanum (La), praseodymium (Pr), neodymium (Nd), promethium (Pm), samarium (Sm), and mixtures thereof.

Treatment Method

As disclosed herein, the method for treating wastewater using a membrane bioreactor includes dosing a wastewater stream, as part of a membrane bioreactor system, containing a first concentration of phosphorus with a dose of a rare earth clarifying agent to obtain a dosed wastewater stream, the first concentration of phosphorus being greater than a target concentration of phosphorus and passing the dosed wastewater stream through the membrane to obtain a membrane permeate stream, the membrane permeate stream having a permeate concentration of phosphorus that is less than the first concentration of phosphorus. Ideally, the permeate concentration of phosphorus can be equal to or less than the target concentration of phosphorus.

FIG. 1 illustrates an embodiment of an internal/submerged MBR configuration. The MBR treatment train/system consists of a headworks (coarse screen, grit removal, and fine screen), flow splitting structure, MBR process (anaerobic, anoxic, pre-aeration, and MBR basins), and UV disinfection. The effluent from the treatment train discharges to the environment. Waste solids from the MBR are conditioned with polymer, dewatered in a screw press, and hauled to the landfill. Pressate from the screw press is recycled back to headworks. In this embodiment $CeCl_3$—$LaCl_3$ clarifying agent is added to the MBR basins.

Figure 2:
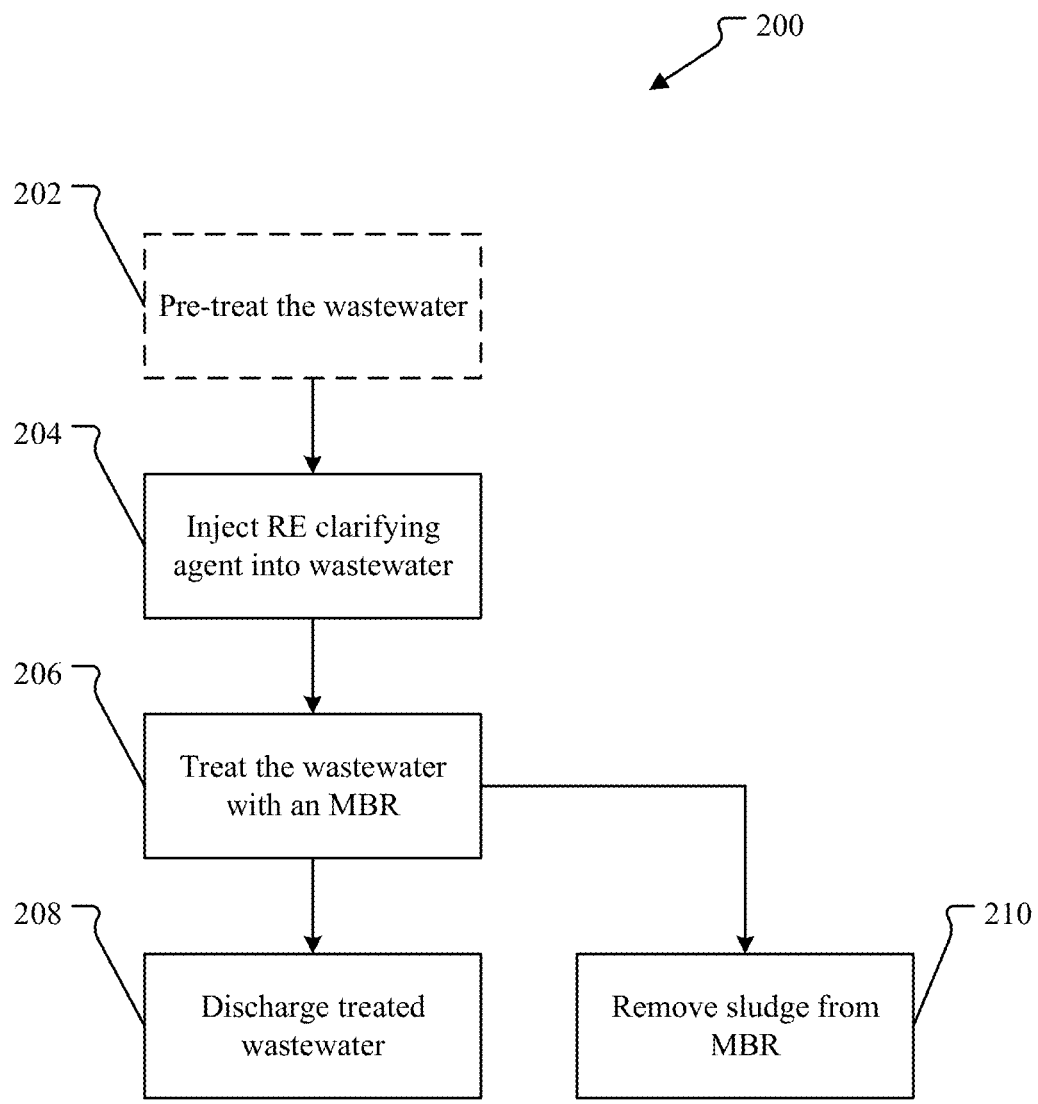
FIG. 2 is a flow chart for an embodiment of a method for treating wastewater with a rare earth element clarifying agent as part of an MBR treatment.

FIG. 2 is a flow chart for an embodiment of a method for treating wastewater with a rare earth element clarifying agent as part of an MBR treatment. In the method 200, the raw wastewater is first optionally passed through a pre-treatment operation 202. The pre-treatment operation 202 may include any pre-treatments to remove large objects, such as for example passing the raw wastewater through a grate, through a knockout tank, or other physical screen separator. In the MBR shown in FIG. 1, passing the wastewater through the headworks (coarse screen, grit removal, and fine screen) is an embodiment of a pre-treatment operation 202.

The pre-treated water is then dosed with the rare earth (e.g., Ce—La) chloride salt clarifying agent in a (Ce—La) dosing operation 204 before the water is passed to the MBR for the MBR treatment operation 206. The rare earth dosing operation 204 injects, mixes, or otherwise adds the rare earth element clarifying agent to the wastewater so that some concentration of rare earth (e.g., Ce—La) elements is obtained in the wastewater during the MBR treatment operation 206. In an embodiment, the total rare earth (e.g., Ce—La) concentration is monitored and the dosing rate is changed or adjusted to maintain a particular target concentration. Alternatively, the dosing rate may be set based on the observed performance of the MBR treatment, e.g., the amount of phosphorus removal, and not adjusted unless degraded performance is observed. Phosphorus removal may be measured as the amount of orthophosphate in the permeate. In yet another embodiment, the dosing rate of the rare earth (e.g., Ce—La) clarifying agent may be adjusted based on measurements of some direct or indirect indicator parameter such as total organic carbon (TOC), chemical oxygen demand (COD), orthophosphate in the permeate, orthophosphate in the influent, total phosphorus (TP), turbidity, and Biochemical Oxygen Demand (BCOD) at the discharge or at some other point in the treatment train. The dose amount of the rare earth clarifying agent may be based on the permeate concentration of phosphorus and the dose amount may be increased if the permeate concentration of phosphorus is greater than the target concentration of phosphorus. The dose amount may be increased so that the permeate concentration of phosphorus achieved is equal to or less than the target concentration of phosphorus.

Figure 3:
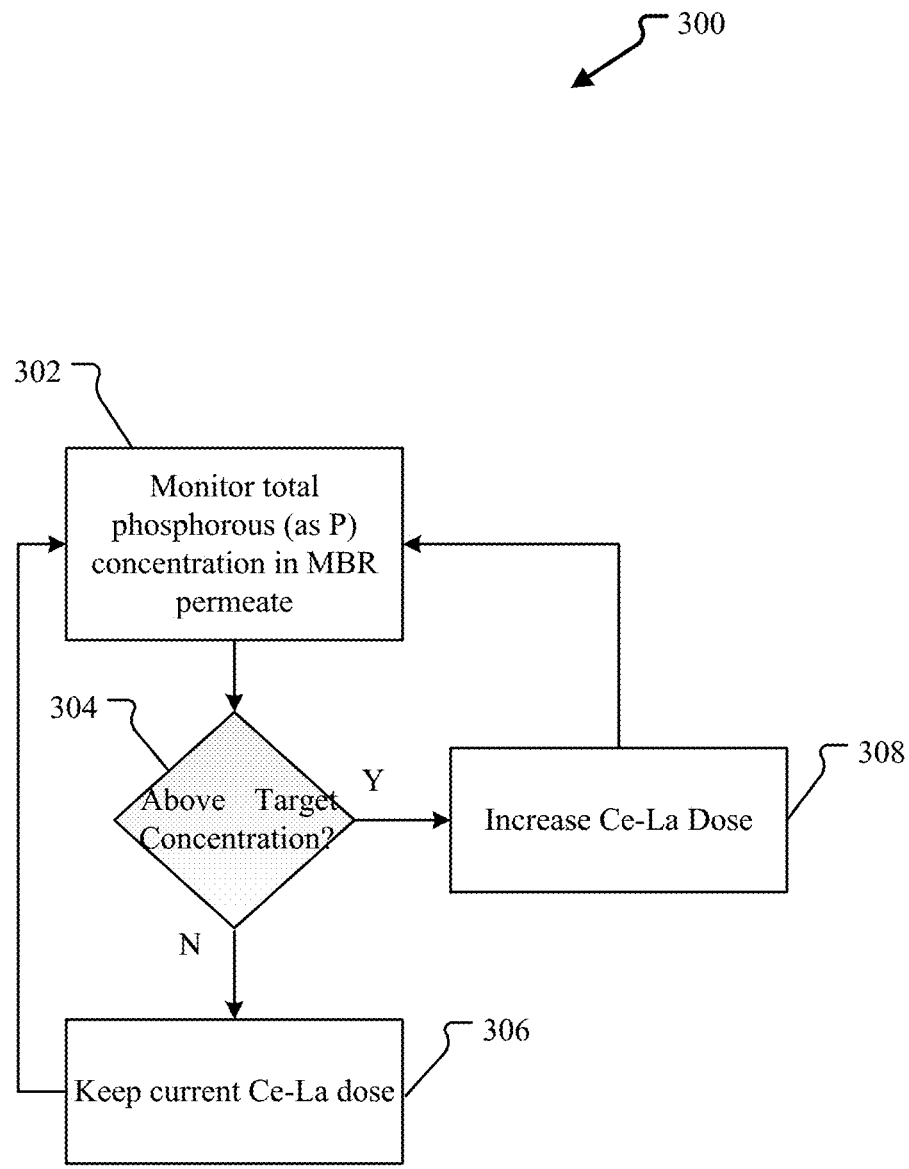
FIG. 3 illustrates an embodiment of a method for changing or adjusting the dose of rare earth (e.g., Ce—La) clarifying agent based on total phosphorus in the permeate, which is a typical discharge limit of wastewater treatment plants.

FIG. 3 illustrates an embodiment of a method for changing the dose of rare earth (e.g., Ce—La) clarifying agent based on total phosphorus in the permeate, which is a typical discharge limit of wastewater treatment plants. In this embodiment, a target concentration of total phosphorus is selected by the operator. This may be the average discharge limit of the plant's discharge permit or some concentration below the average discharge limit. While the MBR treatment system is operating, the total phosphorus concentration is monitored in a monitoring operation 302. The monitoring may be a continuous process or done by one or more samples taken periodically (for example, daily, weekly, or monthly). A determination operation 304 is then performed based on the total phosphorus concentration obtained from the monitoring operation 302. If the total phosphorus concentration is at or below the target concentration, the rare earth (e.g., Ce—La) dose may be maintained as shown in operation 306. If the total phosphorus concentration is above the target concentration, the dose may be increased as shown by the increase dose operation 308. The dose increase may be by a fixed, incremental amount or may be based on how much the target concentration is exceeded (e.g., based on a ratio of the target concentration to the current total phosphorus concentration). Note that FIG. 3 equally applies to adjusting the dose of the clarifying agent (e.g., Ce—La) for the removal of other contaminants such as COD, BOD, turbidity, etc.

Depending on the embodiment, the rare earth (e.g., Ce—La) clarifying agent may be continuously added at a desired rate or discrete amounts may be added batch wise. Furthermore, the clarifying agent may be added at any point in the MBR system, including in the MBR basin and/or the aeration basin and/or injected into the wastewater stream immediately upstream of the MBR basin. For example, in one system configuration, the dosing operation 204 is performed using a simple metering pump set to inject a predetermined amount of the rare earth clarifying agent (e.g., Ce—La) into the wastewater stream between the flow splitter and the MBR basin. In an alternate embodiment, the rare earth clarifying agent may be added directly to the MBR basin. In yet another embodiment, the rare earth clarifying agent may be added in the aeration basin. The dosed wastewater may be held in the MBR basin for a residence time before passing the dosed wastewater through the membrane.

The MBR treatment operation 206 includes retaining the wastewater and rare earth (e.g., Ce—La) clarifying agent for a retention time (residence time) as part of the biological treatment process, thereby allowing flocculation and/or coagulation to occur resulting in separation of solids from the wastewater. The solids are continuously or periodically removed as sludge from the MBR in the sludge removal operation 210. Accordingly, the processes as disclosed herein may also include removing at least some of the phosphorus as precipitated sludge from the wastewater stream before the wastewater stream is passed through the membrane.

Also as part of the MBR treatment operation 206, wastewater in the MBR is forced through the MBR's membrane filters. Water that has passed through the membrane is referred to as permeate. Flow through the membrane is achieved by applying a transmembrane pressure (TMP) on the water across the membrane. The TMP may be created actively (e.g., via a pump pushing or pulling water through the membrane) or passively (e.g., using the height of the water column in the MBR basin relative to the pressure on the permeate side of the membrane). TMP is one of many performance metrics that may be monitored by an MBR operator. An increase in TMP necessary to maintain a given permeate flowrate is indicative of fouling of the membrane.

The membrane of the MBR may be of any of the following materials: polyvinylidene fluoride (PVDF);

polyether sulfone (PES); polysulfone (PS); polyacrylonitrile (PAN); polyvinylchloride (PVC); polypropylene; chlorinated polyethylene; polyimide; polyamide; cellulose acetate; silicone-coated polyimide; polyether ether ketone (PEEK), alumina, silica, or ceramic, and the like. In certain embodiments, PES and PVDF membranes are preferred. The membrane pore size may be approximately 0.0001 microns to 0.5 microns. In certain embodiments, the membrane pore size may be approximately 0.01 to 0.5 microns. The membrane also may be of any configuration, including, for example, flat sheet, hollow fiber, tubular, spiral wound, and the like. In certain embodiments, flat sheet or hollow fiber configurations are preferred.

In the flow chart shown in FIG. 2, the MBR treatment is followed by a discharge operation 220 in which the permeate is discharged to the environment or otherwise used as treated water. In an alternative embodiment, the permeate may be subjected to additional treatment (not shown), such as adjustment for pH or other parameters.

As shown in the Examples, below, the addition of the rare earth (e.g., Ce—La) clarifying agent improves the performance of the MBR treatment in terms of improved P removal. The rare earth (e.g., Ce—La) clarifying agent also may improve performance of the MBR treatment in terms of time of operation without fouling of the membrane. It is believed that this performance will be observed in any MBR regardless of membrane material, pore size and configuration. The addition of the rare earth (e.g., Ce—La) clarifying agent improves this performance without an increase in pressure indicating fouling of the membrane for a suitable time to allow for an efficient and economic operation of the MBR treatment process.

Rare Earth Element Treatment Levels

In one embodiment of the method 200, the rare earth chloride (e.g., Ce—La) treatment level to be obtained in the dosing operation 204 is based on the amount of rare earth (e.g., Ce—La) (in mol of total rare earth elements or mol RE) per liter (L) of wastewater. In this embodiment, the dosing rate of the rare earth clarifying agent is varied based on the wastewater stream's volumetric flowrate to achieve a predetermined concentration target of g/L or mol/L of rare earth elements to liter of wastewater.

In one embodiment the range of the dose is from about 0.0005 to 5.0 mmol RE/L wastewater. In another the dose is from about 0.005 to 1.0 mmol RE/L wastewater. In a yet another embodiment, the concentration target is from about 0.01 to 0.2 mmol RE/L wastewater. This dosing target may be used regardless of which embodiment of rare earth clarifying agent described above is used.

In an alternative embodiment, the dose may be determined empirically in the field by applying an effective amount of rare earth (e.g., Ce—La) clarifying agent necessary to achieve some target treatment level, e.g., at or below a target total phosphorus level, target orthophosphate (as P) level, target COD level, target BOD level, target TSS level, or target turbidity level. In this embodiment, the dose of the rare earth (e.g., Ce—La) clarifying agent applied in the dosing operation 204 is based on achieving a phosphorus concentration in the permeate output by the MBR treatment. For example, in an embodiment, the wastewater is dosed with a rare earth (e.g., Ce—La) clarifying agent described above in an amount sufficient to obtain P ranging from 0 to 9 mg/L. In certain embodiments, the target phosphorus levels may be a limit of undetectable to about 1 mg/L. In some instances, the limit of detection is about 0.05 mg/L.

EXAMPLES

The following examples are given to be illustrative of the inventive method and the scope of the invention is in no way limited thereby.

Example 1—Full-Scale Pilot Test

A full-scale pilot test was performed at a MBR wastewater treatment plant (WWTP) for a period of 106 days. The WWTP had an MBR treatment train matching that of FIG. 1 that used chlorinated polyethylene membranes having a 0.1 micron nominal pore size. A $CeCl_3$—$LaCl_3$ clarifying agent was dosed directly into the WWTP's membrane bioreactor (MBR). The rare earth elements in the $CeCl_3$—$LaCl_3$ clarifying agent were nominally 66% Ce by total weight of rare earth elements in the clarifying agent, 33% by weight La, and the balance of rare earth elements being less than 1% by weight in total of other rare earth elements.

The purposes of the pilot study were to demonstrate: 1) Compliance with the upcoming effluent total phosphorus (TP) limit; 2) A dosing strategy to reduce chemical addition; 3) The expected sludge generation; 4) Expectations for membrane fouling; 5) Effluent toxicity; 6) And ramifications of addition of the $CeCl_3$—$LaCl_3$ clarifying agent to the biological treatment. The results from the pilot study were acceptable and WWTP operator has indicated plans to implement the addition of the $CeCl_3$—$LaCl_3$ clarifying agent permanently.

The WWTP operator was required to meet ultra-low level total phosphorus (TP) limits. The WWTP National Pollutant Discharge Elimination System (NPDES) permit requires the WWTP meet a seasonal monthly TP limit of 0.07 mg/L (as phosphorus) in its discharge, while influent TP typically could range from 1.5 to 4 mg/L.

During the pilot test, the following parameters were measured continuously:
  Influent orthophosphate (Phosphax sc Phosphate Analyzer by Hach; recorded every 15 minutes)
  Process basin dissolved oxygen (DO; DO probes; recorded hourly for each pre-aeration basin)
  Recycle (RAS) flow (magnetic flow meters; daily total)
  Transmembrane pressure (TMP; pressure sensors; recorded every minute)
  Permeate flow (magnetic flow meters; daily total)
  Permeate pH (pH probes; recorded every minute)
  Permeate turbidity (turbidity probes; recorded every minute)
  Permeate orthophosphate (Phosphax sc Phosphate Analyzer by Hach; recorded every 15 minutes)
  Waste activated sludge (WAS) flow (magnetic flow meter; daily total)

During the pilot test, the following parameters were measured periodically:
  Process basin MLSS concentrations (grab samples from MBR basins)
  Process basin pH readings (grab samples from MBR basins)
  Permeate chlorine levels (grab samples from permeate sampling location)
  Permeate orthophosphate (grab samples from permeate sampling location)
  Sludge toxicity (using toxicity characteristic leaching procedure (TCLP); grab samples during dewatering)
  Sludge paint filter test (grab samples during dewatering)

24-hour composite samples (using automatic composite sampler with hourly grabs) were taken analyzed by an offsite analytical laboratory for the following:
  Influent phosphorus
  Influent orthophosphate
  Permeate total phosphorus
  Permeate toxicity
  Permeate biochemical oxygen demand (BOD5)
  Permeate total suspended solids (TSS)
  Permeate ammonia
  Permeate total nitrogen An orthophosphate analyzer was installed in the flow splitter and in the permeate line. The orthophosphate readings in the permeate line were used to control the clarifying agent's chemical dosing pump. A pH probe located in the permeate line was used to control the caustic dosing pump. When a set-point was reached (0.1 mg/L for orthophosphate (as P) and 6.5 for pH), the corresponding dosing pump was activated. The dosing rate was constant until the shutoff level was achieved (0.05 mg/L for orthophosphate (as P) and 7.0 for pH). The dosing rate was adjusted during the pilot test to determine appropriate dosing levels.

Figure 4A:
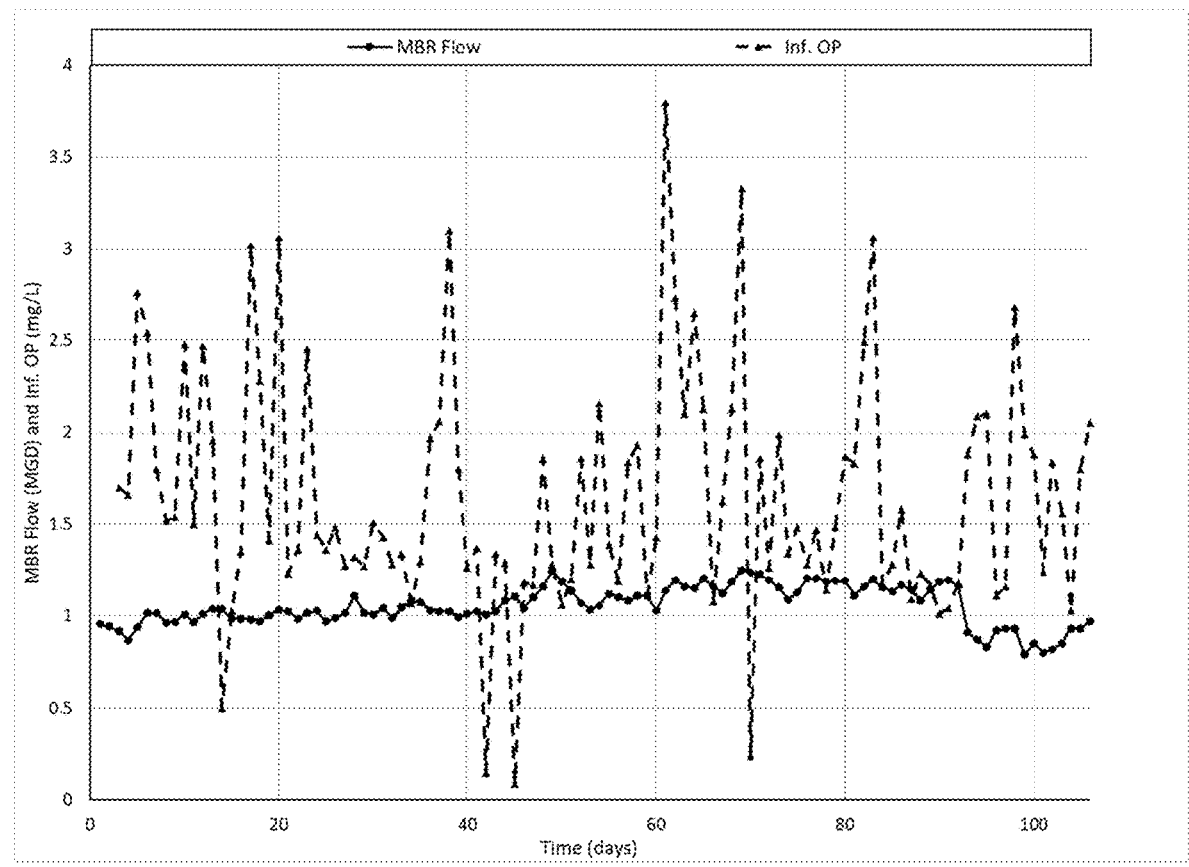
FIG. 4A graphically presents data of the pilot study of Example 1 showing MBR Flow and Influent OP.
Figure 4B:
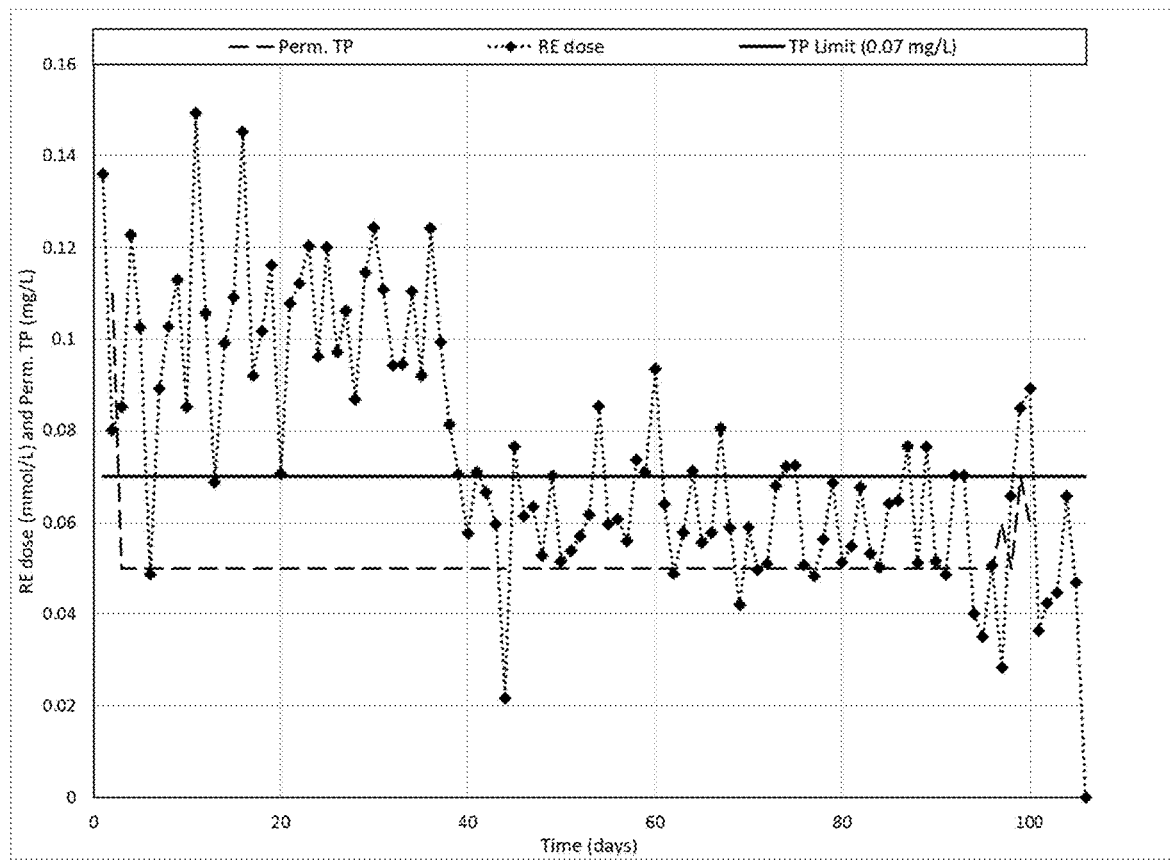
FIG. 4B graphically presents data of the pilot study of Example 1 showing Permeate TP, RE dose, and TP limit.

FIGS. 4A and 4B present the data from the pilot study. In FIG. 4A, the MBR flow and Influent OP (Inf OP) are graphed. In FIG. 4B, permeate TP (Perm TP), RE dose, and TP Limit are graphed. In the pilot study the TP goal was 0.07 mg/L and the TP limit of detection was 0.05 mg/L.

As can be easily seen, treatment using the clarifying agent caused the TP in the effluent to fall to non-detectable concentrations within 3 days of treatment and remain at non-detectable levels for the duration of the test. The daily dose of RE varied from a low of approximately 9 gallons per day to high of 55 gallons per day of Ce—La clarifying agent. The influent wastewater flows are included in FIG. 4C along with a calculation of the dose rate of Ce—La clarifying agent in g RE and mmol RE per liter of wastewater into the MBR.

The following Tables 1-4 show data taken during the full scale pilot on different days mentioned above. In the Tables, "Inf." refers to influent flow. "OP" is orthophosphate reported as mg/L of P. "Perm." refers to the permeate of the MBR. "Composite" refers to a composite sample taken over a day as described above. "TP" is total orthophosphate as P in mg/L. "BOD" is biological oxygen demand in mg/L. "TSS" is total suspended solids in mg/L. "RE Dose" is gallons per day (GPD) of 2.6 RE mol/L solution of Ce—La clarifying agent added for that day. The RE Dose is reported as mmol RE/L wastewater.

TABLE 1

Full Scale Pilot Daily Log

| | | Inf Flow | phosphorus analyzer (mg/L) | | Composite Perm. (mg/L) | | | RE Dose | |
|---|---|---|---|---|---|---|---|---|---|
| Date | Time | MGD | Inf. OP | Perm. OP | TP | BOD | TSS | GPD | mmol RE/L |
| 1 | 12:00 | 0.9566 | | | | | | 50 | 0.1359 |
| 2 | 6:00 | 0.9415 | | | 0.11 | 3 | 4 | 29 | 0.0801 |
| 3 | 6:15 | 0.9168 | 1.70 | 0.14 | 0.05 | 3 | 3 | 30 | 0.0851 |
| 4 | 7:07 | 0.8672 | 1.66 | 0.10 | 0.05 | 3 | 3 | 41 | 0.1229 |
| 5 | 13:46 | 0.9387 | 2.76 | 0.12 | 0.05 | 3 | 5 | 37 | 0.1025 |
| 6 | 14:59 | 1.0149 | 2.54 | 0.14 | 0.05 | 3 | 4 | 19 | 0.0487 |
| 7 | 7:25 | 1.013 | 1.80 | 0.12 | 0.05 | 3 | 3 | 34.7 | 0.0891 |
| 8 | 7:15 | 0.9615 | 1.52 | 0.14 | 0.05 | 3 | 4 | 38 | 0.1028 |
| 9 | 6:45 | 0.9671 | 1.54 | 0.15 | 0.05 | 3 | 3 | 42 | 0.1129 |
| 10 | 8:10 | 1.0076 | 2.48 | 0.17 | 0.05 | 3 | 3 | 33 | 0.0851 |
| 11 | 6:24 | 0.9668 | 1.50 | 0.15 | 0.05 | 3 | 3 | 55.5 | 0.1493 |
| 12 | 13:53 | 1.0096 | 2.47 | 0.14 | 0.05 | 3 | 2 | 41 | 0.1056 |
| 13 | 16:37 | 1.0395 | 1.96 | 0.09 | 0.05 | 3 | 2 | 27.5 | 0.0688 |
| 14 | 8:30 | 1.0366 | 0.50 | 0.16 | 0.05 | 3 | 5 | 39.5 | 0.0991 |
| 15 | 8:00 | 0.9851 | 1.03 | 0.32 | 0.05 | 3 | 3 | 41.4 | 0.1093 |
| 16 | 7:48 | 0.9843 | 1.35 | 0.08 | 0.05 | 3 | 2 | 55 | 0.1453 |
| 17 | 12:17 | 0.9804 | 3.02 | 0.08 | 0.05 | 3 | 2 | 34.7 | 0.092 |
| 18 | 7:40 | 0.9696 | 2.28 | 0.10 | 0.05 | 3 | 2 | 38 | 0.1019 |
| 19 | 8:47 | 1.002 | 1.41 | 0.09 | 0.05 | 3 | 2 | 44.8 | 0.1163 |
| 20 | 13:00 | 1.0317 | 3.06 | 0.10 | 0.05 | 3 | 2 | 28 | 0.0706 |
| 21 | 7:18 | 1.0252 | 1.23 | 0.11 | 0.05 | 3 | 2 | 42.5 | 0.1078 |
| 22 | 7:00 | 0.9837 | 1.36 | 0.08 | 0.05 | 3 | 2 | 42.5 | 0.1123 |
| 23 | 8:03 | 1.0157 | 2.45 | 0.09 | 0.05 | 3 | 2 | 47 | 0.1203 |
| 24 | 7:20 | 1.0287 | 1.44 | 0.11 | 0.05 | 3 | 2 | 38.1 | 0.0963 |
| 25 | 7:15 | 0.9689 | 1.36 | 0.12 | 0.05 | 3 | 2 | 44.8 | 0.1202 |
| 26 | 8:00 | 0.9898 | 1.48 | 0.16 | 0.05 | 3 | 2 | 37 | 0.0972 |
| 27 | 7:30 | 1.0146 | 1.27 | 0.04 | 0.05 | 3 | 2 | 41.4 | 0.1061 |
| 28 | 8:00 | 1.1092 | 1.32 | 0.07 | 0.05 | 3 | 2 | 37 | 0.0867 |
| 29 | 7:15 | 1.0172 | 1.27 | 0.09 | 0.05 | 3 | 2 | 44.8 | 0.1145 |
| 30 | 7:00 | 1.007 | 1.51 | 0.13 | 0.05 | 3 | 2 | 48.2 | 0.1244 |

TABLE 2

Full Scale Pilot Daily Log

| | | Inf Flow | phosphorus analyzer (mg/L) | | Composite Perm. (mg/L) | | | RE Dose | |
|---|---|---|---|---|---|---|---|---|---|
| Date | Time | MGD | Inf. OP | Perm. OP | TP | BOD | TSS | GPD | mmol RE/L |
| 31 | 7:00 | 1.0411 | 1.43 | 0.06 | 0.05 | 3 | 2 | 44.4 | 0.1109 |
| 32 | 7:15 | 0.988 | 1.43 | 0.06 | 0.05 | 3 | 2 | 35.8 | 0.0942 |

TABLE 2-continued

Full Scale Pilot Daily Log

| | | Inf Flow | phosphorus analyzer (mg/L) | | Composite Perm. (mg/L) | | | RE Dose | |
|---|---|---|---|---|---|---|---|---|---|
| Date | Time | MGD | Inf. OP | Perm. OP | TP | BOD | TSS | GPD | mmol RE/L |
| 33 | 7:00 | 1.0454 | 1.28 | 0.09 | 0.05 | 3 | 2 | 38 | 0.0945 |
| 34 | 7:15 | 1.0826 | 1.34 | 0.10 | 0.05 | 3 | 2 | 46 | 0.1105 |
| 35 | 7:15 | 1.0736 | 1.07 | 0.10 | 0.05 | 3 | 2 | 38 | 0.092 |
| 36 | 7:45 | 1.0309 | 1.30 | 0.10 | 0.05 | 3 | 2 | 49.3 | 0.1243 |
| 37 | 8:00 | 1.0257 | 1.97 | 0.08 | 0.05 | 3 | 2 | 39.2 | 0.0994 |
| 38 | 8:30 | 1.026 | 2.06 | 0.08 | 0.05 | 3 | 2 | 32.1 | 0.0813 |
| 39 | 7:30 | 0.9935 | 3.10 | 0.10 | 0.05 | 3 | 2 | 27 | 0.0707 |
| 40 | 7:30 | 1.0096 | 1.80 | 0.09 | 0.05 | 3 | 2 | 22.4 | 0.0577 |
| 41 | 7:45 | 1.0248 | 1.26 | 0.09 | 0.05 | 3 | 2 | 28 | 0.071 |
| 42 | 7:30 | 1.0068 | 1.37 | 0.09 | 0.05 | 3 | 2 | 25.8 | 0.0666 |
| 43 | 7:05 | 1.0238 | 0.15 | 0.13 | 0.05 | 3 | 2 | 23.5 | 0.0597 |
| 44 | 6:45 | 1.0827 | 1.34 | 0.11 | 0.05 | 3 | 2 | 9 | 0.0216 |
| 45 | 5:45 | 1.1046 | 1.29 | 0.09 | 0.05 | 3 | 2 | 32.5 | 0.0765 |
| 46 | 7:15 | 1.0425 | 0.09 | 0.10 | | | | 24.6 | 0.0614 |
| 47 | 7:45 | 1.1015 | 1.18 | 0.10 | 0.05 | 3 | 2 | 26.9 | 0.0635 |
| 48 | 8:45 | 1.1582 | 1.17 | 0.08 | 0.05 | 3 | 2 | 23.5 | 0.0528 |
| 49 | 7:15 | 1.2451 | 1.86 | 0.11 | 0.05 | 3 | 2 | 33.6 | 0.0702 |
| 50 | 7:15 | 1.1867 | 1.28 | 0.08 | 0.05 | 3 | 2 | 23.5 | 0.0515 |
| 51 | 7:15 | 1.1346 | 1.06 | 0.09 | 0.05 | 3 | 2 | 23.5 | 0.0539 |
| 52 | 7:25 | 1.0703 | 1.20 | 0.08 | 0.05 | 3 | 2 | 23.5 | 0.0571 |
| 53 | 7:15 | 1.0346 | 1.86 | 0.09 | 0.05 | 3 | 2 | 24.6 | 0.0618 |
| 54 | 8:15 | 1.0577 | 1.28 | 0.07 | 0.05 | 3 | 2 | 34.7 | 0.0853 |
| 55 | 8:00 | 1.12 | 2.16 | 0.08 | 0.05 | 3 | 2 | 25.7 | 0.0597 |
| 56 | 7:30 | 1.1017 | 1.39 | 0.68 | 0.05 | 3 | 2 | 25.7 | 0.0607 |
| 57 | 7:15 | 1.0814 | 1.19 | 0.08 | 0.05 | 3 | 2 | 23.35 | 0.0561 |
| 58 | 7:30 | 1.1087 | 1.84 | 0.09 | 0.05 | 3 | 2 | 31.4 | 0.0736 |
| 59 | 7:30 | 1.1076 | 1.93 | 0.08 | 0.05 | 3 | 2 | 30.2 | 0.0709 |
| 60 | 7:15 | 1.0291 | 1.11 | 0.15 | 0.05 | 3 | 2 | 37 | 0.0935 |

TABLE 3

Full Scale Pilot Daily Log

| | | Inf Flow | phosphorus analyzer (mg/L) | | Composite Perm. (mg/L) | | | RE Dose | |
|---|---|---|---|---|---|---|---|---|---|
| Date | Time | MGD | Inf. OP | Perm. OP | TP | BOD | TSS | GPD | mmol RE/L |
| 61 | 10:25 | 1.1383 | 3.80 | 0.08 | 0.05 | 3 | 2 | 28 | 0.064 |
| 62 | 9:30 | 1.1926 | 2.73 | 0.08 | 0.05 | 3 | 2 | 22.4 | 0.0488 |
| 63 | 7:45 | 1.1608 | 2.10 | 0.11 | 0.05 | 3 | 2 | 25.8 | 0.0578 |
| 64 | 8:40 | 1.1486 | 2.65 | 0.07 | 0.05 | 3 | 2 | 31.4 | 0.0711 |
| 65 | 8:30 | 1.2033 | 2.13 | 0.07 | 0.05 | 3 | 2 | 25.8 | 0.0557 |
| 66 | 7:30 | 1.1595 | 1.08 | 0.07 | 0.05 | 3 | 2 | 25.8 | 0.0579 |
| 67 | 7:30 | 1.1214 | 1.62 | 0.06 | 0.05 | 3 | 2 | 34.7 | 0.0805 |
| 68 | 8:40 | 1.1875 | 2.13 | 0.08 | 0.05 | 3 | 2 | 26.9 | 0.0589 |
| 69 | 10:45 | 1.2483 | 3.33 | 0.11 | 0.05 | 3 | 2 | 20.2 | 0.0421 |
| 70 | 7:20 | 1.2349 | 0.24 | 0.10 | 0.05 | 3 | 2 | 28 | 0.059 |
| 71 | 7:40 | 1.2277 | 1.86 | 0.12 | 0.05 | 3 | 2 | 23.5 | 0.0498 |
| 72 | 7:15 | 1.194 | 1.26 | 0.13 | 0.05 | 3 | 2 | 23.5 | 0.0512 |
| 73 | 7:45 | 1.1538 | 1.99 | 0.1 | 0.05 | 3 | 2 | 30.2 | 0.0681 |
| 74 | 7:15 | 1.0884 | 1.34 | 0.12 | 0.05 | 3 | 2 | 30.2 | 0.0721 |
| 75 | 7:35 | 1.1268 | 1.48 | 0.6 | 0.05 | 3 | 2 | 31.4 | 0.0725 |
| 76 | 7:15 | 1.2016 | 1.28 | 0.13 | 0.05 | 3 | 2 | 23.5 | 0.0508 |
| 77 | 7:15 | 1.2045 | 1.47 | 0.1 | 0.05 | 3 | 2 | 22.4 | 0.0484 |
| 78 | 6:15 | 1.1874 | 1.14 | 0.13 | 0.05 | 3 | 2 | 25.8 | 0.0565 |
| 79 | 7:15 | 1.1896 | 1.48 | 0.15 | 0.05 | 3 | 2 | 31.4 | 0.0686 |
| 80 | 7:35 | 1.191 | 1.87 | 0.1 | 0.05 | 3 | 2 | 23.5 | 0.0513 |
| 81 | 7:45 | 1.1113 | 1.83 | 0.11 | 0.05 | 3 | 2 | 23.5 | 0.055 |
| 82 | 8:50 | 1.1582 | 2.49 | 0.12 | 0.05 | 3 | 2 | 30.2 | 0.0678 |
| 83 | 11:15 | 1.1982 | 3.06 | 0.11 | 0.05 | 3 | 2 | 24.6 | 0.0534 |
| 84 | 7:15 | 1.1567 | 1.17 | 0.1 | 0.05 | 3 | 2 | 22.4 | 0.0504 |
| 85 | 7:20 | 1.1336 | 1.28 | 0.11 | 0.05 | 3 | 2 | 28 | 0.0642 |
| 86 | 7:25 | 1.1658 | 1.58 | 0.1 | 0.05 | 3 | 2 | 29.1 | 0.0649 |
| 87 | 7:20 | 1.1426 | 1.09 | 0.11 | 0.05 | 3 | 2 | 33.6 | 0.0765 |
| 88 | 6:30 | 1.0828 | 1.23 | 0.11 | 0.05 | 3 | 2 | 21.3 | 0.0511 |
| 89 | 6:30 | 1.1403 | 1.17 | 0.11 | 0.05 | 3 | 2 | 33.6 | 0.0766 |
| 90 | 7:05 | 1.1856 | 1.01 | 0.09 | 0.05 | 3 | 2 | 23.5 | 0.0515 |

TABLE 4

Full Scale Pilot Daily Log

| | | Inf Flow | phosphorus analyzer (mg/L) | | Composite Perm. (mg/L) | | | RE Dose | |
|---|---|---|---|---|---|---|---|---|---|
| Date | Time | MGD | Inf. OP | Perm. OP | TP | BOD | TSS | GPD | mmol RE/L |
| 91 | 7:10 | 1.1952 | 1.04 | 0.12 | 0.05 | 3 | 2 | 22.4 | 0.0487 |
| 92 | 7:20 | 1.1634 | 1.18 | 0.12 | 0.05 | 3 | 2 | 31.4 | 0.0702 |
| 93 | 9:05 | 0.91 | 1.88 | 0.11 | 0.05 | | | 24.6 | 0.0703 |
| 94 | 8:00 | 0.87 | 2.09 | 0.13 | 0.05 | | | 13.4 | 0.04 |
| 95 | 8:00 | 0.83 | 2.10 | 0.16 | 0.05 | | | 11.2 | 0.0351 |
| 96 | 7:25 | 0.92 | 1.11 | 0.10 | 0.05 | | | 17.9 | 0.0506 |
| 97 | 7:50 | 0.93 | 1.16 | 0.13 | 0.06 | | | 10.1 | 0.0282 |
| 98 | 9:05 | 0.93 | 2.68 | 0.17 | 0.05 | | | 23.5 | 0.0657 |
| 99 | 7:10 | 0.79 | 1.99 | 0.17 | 0.07 | | | 25.8 | 0.0849 |
| 100 | 8:20 | 0.85 | 1.88 | 0.13 | 0.06 | | | 29.1 | 0.089 |
| 101 | 7:17 | 0.8 | 1.24 | 0.13 | | | | 11.2 | 0.0364 |
| 102 | 7:40 | 0.82 | 1.84 | 0.13 | | | | 13.4 | 0.0425 |
| 103 | 7:50 | 0.85 | 1.56 | 0.18 | | | | 14.6 | 0.0447 |
| 104 | 7:15 | 0.93 | 1.03 | 0.19 | | | | 23.5 | 0.0657 |
| 105 | 7:35 | 0.93 | 1.80 | 0.19 | | | | 16.8 | 0.047 |
| 106 | 7:45 | 0.97 | 2.05 | 0.19 | | | | | |

Conclusions:

A 106-day full-scale pilot trial dosing RE into a functioning MBR was successfully conducted. The addition of RE successfully lowered the effluent P to the target levels. The effluent TSS and BOD concentrations were consistently low. Importantly, there were no adverse effects on the operation of the MBR. The average TMP levels during the trial were 12±4 kPa, which is normal for this particular facility and did not indicate membrane fouling. It also is worth noting that the addition of RE did not appear to affect the biological treatment or inorganically foul the membranes.

Example 2—Lab Scale MBR

Figure 5A:
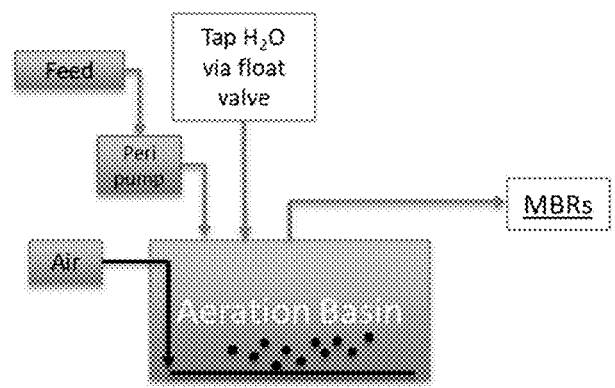
FIGS. 5A and 5B illustrate the experimental setup of Example 2.
Figure 5B:
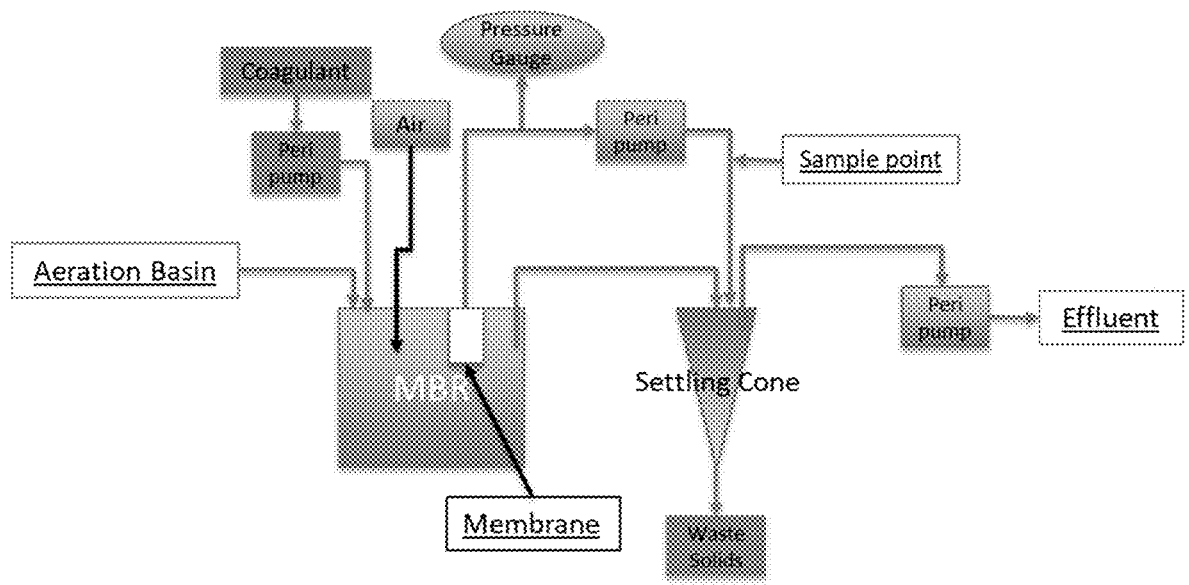

Experimental Procedure:

The experimental setup of Example 2 is illustrated in FIGS. 5A and 5B. FIG. 5A illustrates specifically the aeration basin portion of the experimental setup and FIG. 5B illustrates the overall experimental setup.

A 40 gal aquarium (max capacity of 38 gal) was fitted with aerators and overhead agitators. To this a feed solution composing of a concentrated version of Syntho was continuously added via a peristaltic pump. (For the composition of Syntho, see, G. Boeij e; R. Corstanje; A. Rottiers; D. Schowanek *Chemosphere*, 1999, 38(4), pp. 699-709, the contents of which are herein incorporated by reference.) The aeration basin was seeded with a water extract of commercially available top soil from Ace Hardware. The liquid level was maintained using a float valve connected to tap water. A syphon was maintained between the aeration basin and 4 separate 2 gal membrane bioreactors (MBR). Each MBR was equipped with an overhead agitator and air sparging. A syphon was maintained from each MBR to a settling cone. A peristaltic pump removed the water from the top of the cone and was set at 25 ml/min, thus the hydraulic retention time (HRT) for each MBR was approximately 5 hrs and the HRT for the aeration basin was approximately 24 hrs. To each MBR a U-shaped hollow fiber membrane bundle was submerged and connected to a peristaltic pump and a vacuum pressure gauge. The hollow fiber membranes were purchased from Memstar and composed of PVDF with a pore size of 0.04 micron. The peristaltic pumps to pull water through the membranes were programmed to operate on a 8 min on and 2 min off repeating cycle. The first and last MBR was allowed to operate without the addition of coagulant. The remaining two MBRs were continually dosed with solutions of $RECl_3$ and $FeCl_3$. $RECl_3$ is a mixture of Lanthanum (La) and Cerium (Ce) in an approximate 1:2 La:Ce ratio. $FeCl_3$ solution was a product of MG Chemicals. In order to have a convenient dose size the $RECl_3$ solution was diluted to a concentration of $1.9 \times 10^{-3}$ mol/L RE and the $FeCl_3$ solution was diluted to $7.7 \times 10 \times 10^{-3}$ mol/L Fe. It is important to note that the Fe concentration is four times the RE concentration because this increased Fe concentration was required to achieve the same target phosphorus level.

Analysis methods: ortho-phosphate was analyzed using Hach testing products according to Hach's recommended procedures. Transmembrane pressure (TMP) was measured using a vacuum pressure gauge. Flux was measured using a stopwatch and a graduated cylinder.

Figure 6:
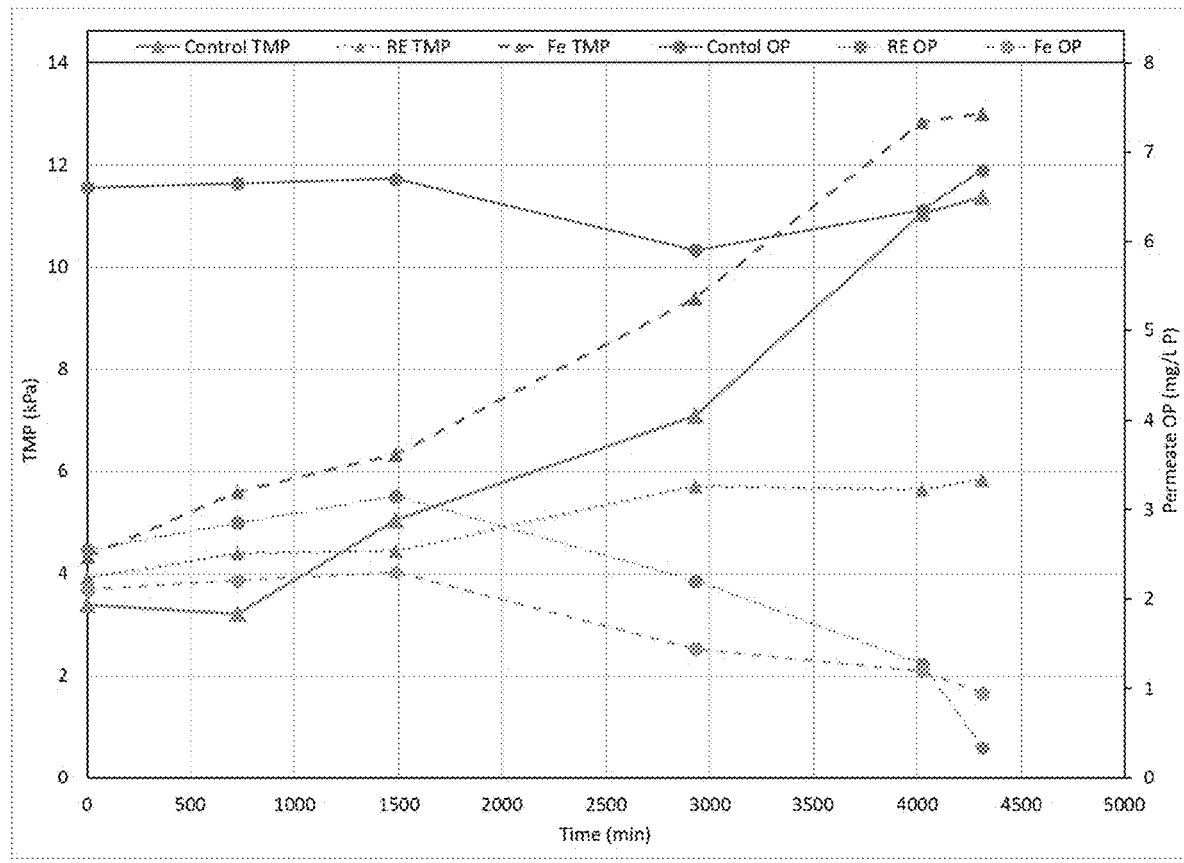
FIG. 6 graphically presents the collected data for transmembrane pressure (TMP) and permeate ortho-phosphate (OP) concentration for Experimental 2-1.

Experimental 2-1:

To the MBRs described above, the U-shaped hollow fiber membrane bundle was submerged. The membrane bundle had a surface area of $0.05 \ m^2$. The peristaltic pumps pulling solution through the membrane were set and adjusted periodically so the membrane flux was 12 ml/min or approximately 15 $L/m^2$ hr. The coagulant dose was set to reach an approximate permeate ortho-phosphate (OP) concentration of 2 mg/L. This dose was approximately 1 ml/min for each coagulant at the concentrations listed above. After approximately 3000 min into the experiment the dose was increased (to approximately 3 ml/min) to achieve a permeate P of less than 1 mg/L. The collected data for trans-membrane pressure (TMP) and permeate ortho-phosphate (OP) concentration is presented graphically in the FIG. 6 and tabulated in Table 5 below.

The Dose of RE is reported as mmol RE/L wastewater and the Dose of Ferric is reported as mmol Fe/L wastewater.

TABLE 5

| Time | TMP (kPa) | | | Permeate OP (mg/L) | | | Dose (mmol/L) | |
|---|---|---|---|---|---|---|---|---|
| (min) | Control | RE | Ferric | Control | RE | Ferric | RE | Fe |
| 0 | 3.38 | 3.92 | 4.33 | 6.6 | 2.55 | 2.1 | 0.074 | 0.296 |
| 726 | 3.2 | 4.39 | 5.59 | 6.65 | 2.85 | 2.2 | 0.074 | 0.296 |
| 1483 | 5.04 | 4.45 | 6.33 | 6.7 | 3.15 | 2.3 | 0.074 | 0.296 |
| 2929 | 7.09 | 5.7 | 9.38 | 5.9 | 2.2 | 1.44 | 0.074 | 0.296 |
| 4024 | 11.04 | 5.64 | 12.84 | 6.35 | 1.27 | 1.19 | 0.222 | 0.888 |
| 4314 | 11.37 | 5.83 | 13.01 | 6.8 | 0.34 | 0.95 | 0.222 | 0.888 |

Figure 7:
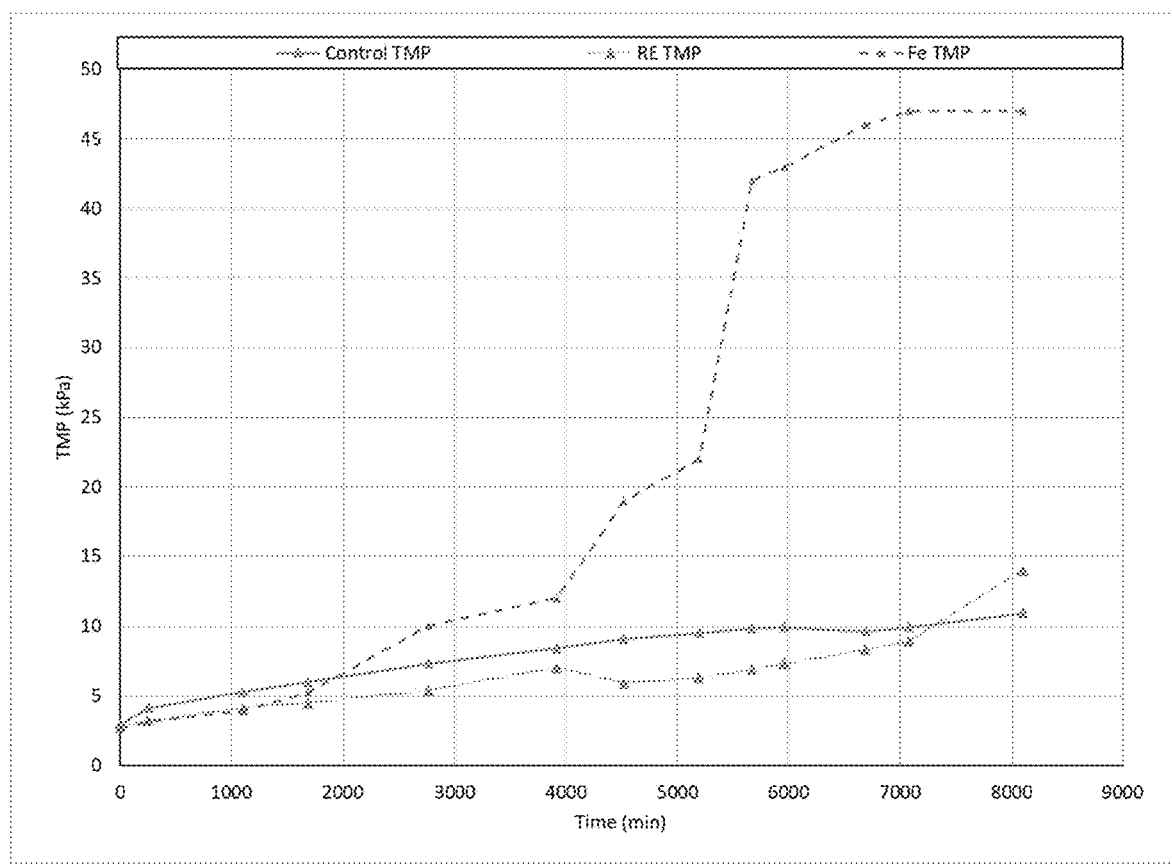
FIG. 7 graphically presents the collected data for transmembrane pressure (TMP) for Experimental 2-2.

Experimental 2-2:

To the MBRs described above in Example 2, a U-shaped hollow fiber membrane bundle was submerged. The membrane bundle had a surface area of 0.025 m². The peristaltic pumps were set and adjusted periodically so the membrane flux was 6 ml/min or approximately 15 L/m² hr. The coagulant dose was set to remove approximately 2 mg/L P (0.8 ml/min) from the permeate ortho-phosphate (OP) concentration. For RE this yields a concentration of 0.059 mmol RE/L wastewater and for Ferric this yields a concentration of 0.296 mmol Fe/L wastewater. The collected data for trans-membrane pressure (TMP) is presented graphically in the FIG. 7. The collected data for trans-membrane pressure (TMP) and permeate ortho-phosphate (OP) concentration is tabulated in Table 6 below.

TABLE 6

| Time (min) | TMP (kPa) | | | Permeate OP (mg/L) | | |
|---|---|---|---|---|---|---|
| | Control | RE | Ferric | Control | RE | Ferric |
| 0 | 2.96 | 2.88 | 2.66 | 7.6 | 4.9 | 3.6 |
| 252 | 4.11 | 3.22 | 3.14 | — | — | — |
| 1105 | 5.27 | 4.15 | 3.91 | 7.6 | 4.9 | 3.6 |
| 1688 | 5.96 | 4.51 | 5.23 | — | — | — |
| 2762 | 7.3 | 5.39 | 10.03 | 7.6 | 5.1 | 4.4 |
| 3919 | 8.39 | 7.03* | 12 | 6.3 | 3.8 | 3.4 |
| 4521 | 9.04 | 5.9 | 19 | — | — | — |
| 5192 | 9.5 | 6.3 | 22 | — | — | — |
| 5671 | 9.8 | 6.9 | 42 | — | — | — |
| 5961 | 9.9 | 7.3 | 43 | — | — | — |
| 6685 | 9.6 | 8.3 | 46 | — | — | — |
| 7078 | 9.9 | 8.9 | 47 | 6.2 | 3.6 | 3.6 |
| 8098 | 10.9 | 14 | 47 | 6.3 | 3.9 | 3.7 |

*The pump pulling permeate through the membrane malfunctioned and as a result the flux was higher than the 6 ml/min set point. It was corrected after this data point was recorded, thus this point is higher than expected.

Conclusions:

An aeration basin was simulated and MBRs were run simultaneously to test the effect of dosing coagulants, such as $RECl_3$ and $FeCl_3$. The tests were run with hollow fiber PVDF membranes with a set flux of 15 L/m² hr. The Fe concentration needed was four times the RE concentration because this increased Fe concentration was required to achieve the same target phosphorus level. The results indicate that the addition of Fe causes the membrane to foul significantly faster. RE addition to the MBR caused significantly less fouling and allowed efficient operation of the MBRs for a significantly longer period of time. For this experimental setup, a TMP of about 14 kPa indicated membrane fouling.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained.

Notwithstanding that the numerical ranges and parameters setting forth the broad scope of the technology are approximations, the numerical values set forth in the specific examples are reported as precisely as possible. Any numerical value, however, inherently contain certain errors necessarily resulting from the standard deviation found in their respective testing measurements.

It will be clear that the compositions and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A method for treating wastewater using a membrane bioreactor comprising:
    dosing a wastewater stream, as part of a membrane bioreactor system, having a first Biological Oxygen Demand (BOD) and a first Chemical Oxygen Demand (COD), with a rare earth clarifying agent in a dose amount of from about 0.0005 to about 5.0 mmol RE/L wastewater to obtain a dosed wastewater stream; and
    passing the dosed wastewater stream through a membrane of the membrane bioreactor system to obtain a membrane permeate stream, the membrane permeate stream having: a permeate BOD less than the first BOD, a permeate COD less than the first COD, or a combination thereof.

2. The method of claim 1, wherein the rare earth clarifying agent comprises chloride salts of a mixture of rare earth elements.

3. The method of claim 1, wherein the rare earth clarifying agent comprises $CeCl_3$, $LaCl_3$, or mixtures thereof.

4. The method of claim 1, wherein the membrane permeate stream has a permeate BOD equal to or less than a target BOD.

5. The method of claim 1, wherein the membrane permeate stream has a permeate COD equal to or less than a target COD.

6. The method of claim 1, further comprising:
    adjusting the dose amount of the clarifying agent based on the permeate BOD.

7. The method of claim 1, further comprising:
    adjusting the dose amount of the clarifying agent based on the permeate COD.

8. The method of claim 1, further comprising:
    increasing the dose amount of the clarifying agent if the permeate concentration of BOD is greater than a target BOD so that the permeate BOD is equal to or less than the target BOD.

9. The method of claim 1, further comprising:
    increasing the dose amount of the clarifying agent if the permeate concentration of COD is greater than a target COD so that the permeate COD is equal to or less than the target COD.

10. The method of claim 1, further comprising:
    holding the dosed wastewater stream for a residence time before passing the dosed wastewater stream through the membrane.

11. The method of claim 1, wherein dosing reduces BOD, COD, and phosphorus concentration.

12. A method for treating wastewater using a membrane bioreactor comprising:

dosing a wastewater stream, as part of a membrane bioreactor system, having a first Total Suspended Solids (TSS), with a rare earth clarifying agent in a dose amount of from about 0.0005 to about 5.0 mmol RE/L wastewater to obtain a dosed wastewater stream; and passing the dosed wastewater stream through a membrane of the membrane bioreactor system to obtain a membrane permeate stream, the membrane permeate stream having: a permeate TSS less than the first TSS.

13. The method of claim 12, wherein the rare earth clarifying agent comprises chloride salts of a mixture of rare earth elements.

14. The method of claim 12, wherein the rare earth clarifying agent comprises $CeCl_3$, $LaCl_3$, or mixtures thereof.

15. The method of claim 12, wherein the membrane permeate stream has a permeate TSS equal to or less than a target TSS.

16. The method of claim 12, further comprising:
adjusting the dose amount of the clarifying agent based on the permeate TSS.

17. The method of claim 12, further comprising:
increasing the dose amount of the clarifying agent if the permeate concentration of TSS is greater than a target TSS so that the permeate TSS is equal to or less than the target TSS.

18. The method of claim 12, further comprising:
holding the dosed wastewater stream for a residence time before passing the dosed wastewater stream through the membrane.

19. The method of claim 12, wherein dosing reduces TSS and one or more of BOD, COD, and phosphorus concentration.

* * * * *